US010930008B2

(12) United States Patent
Aratani

(10) Patent No.: US 10,930,008 B2
(45) Date of Patent: Feb. 23, 2021

(54) INFORMATION PROCESSING APPARATUS, INFORMATION PROCESSING METHOD, AND PROGRAM FOR DERIVING A POSITION ORIENTATION OF AN IMAGE PICKUP APPARATUS USING FEATURES DETECTED FROM AN IMAGE

(71) Applicant: CANON KABUSHIKI KAISHA, Tokyo (JP)

(72) Inventor: Shinichi Aratani, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/070,235

(22) PCT Filed: Dec. 16, 2016

(86) PCT No.: PCT/JP2016/005165
§ 371 (c)(1),
(2) Date: Jul. 13, 2018

(87) PCT Pub. No.: WO2017/125983
PCT Pub. Date: Jul. 27, 2017

(65) Prior Publication Data
US 2019/0026919 A1 Jan. 24, 2019

(30) Foreign Application Priority Data

Jan. 20, 2016 (JP) .............................. JP2016-009308
Nov. 17, 2016 (JP) .............................. JP2016-224576

(51) Int. Cl.
*G06T 7/73* (2017.01)
*G06T 19/00* (2011.01)
(Continued)

(52) U.S. Cl.
CPC ............ *G06T 7/73* (2017.01); *G02B 27/0172* (2013.01); *G02B 27/0176* (2013.01);
(Continued)

(58) Field of Classification Search
CPC ......... G06T 7/73; G06T 19/20; G06T 19/006; G06T 2207/30244; G02B 27/0172;
(Continued)

(56) References Cited

U.S. PATENT DOCUMENTS

2007/0242899 A1* 10/2007 Satoh ...................... G06T 7/246
382/286
2010/0045701 A1 2/2010 Scott et al.
(Continued)

FOREIGN PATENT DOCUMENTS

EP 1650704 A1 4/2006
JP 4532982 B2 8/2010
(Continued)

OTHER PUBLICATIONS

Yoon, "Increasing Camera Pose Estimation Accuracy Using Multiple Markers", ICAT 2006, Springer-Verlag Berlin Heidelberg 2006. (Year: 2006).*

(Continued)

*Primary Examiner* — Maurice L. McDowell, Jr.
(74) *Attorney, Agent, or Firm* — Canon U.S.A., Inc. IP Division

(57) ABSTRACT

An image obtaining unit that obtains an image picked up by an image pickup apparatus, a first detection unit that detects a first feature from the image, a second detection unit that detects a second feature different from the first feature from the image by using a method different from a method of the first detection unit, a first position orientation derivation unit that derives a position orientation of the image pickup apparatus as a first position orientation on the basis of the first feature detected from the image, a second position orientation derivation unit that derives a position orientation of the image pickup apparatus as a second position orientation on the basis of the second feature detected from the
(Continued)

image, and a decision unit that decides the position orientation of the image pickup apparatus on the basis of the first position orientation and the second position orientation are provided.

22 Claims, 6 Drawing Sheets

(51) Int. Cl.
  *G02B 27/01* (2006.01)
  *G06T 19/20* (2011.01)
  *G06F 3/01* (2006.01)
(52) U.S. Cl.
  CPC ............ *G06F 3/011* (2013.01); *G06T 19/006* (2013.01); *G06T 19/20* (2013.01); *G06T 2207/30244* (2013.01)
(58) Field of Classification Search
  CPC .......... G02B 27/0176; G02B 2027/014; G02B 2027/0138; G02B 27/017; G06F 3/01; G06F 3/011
  See application file for complete search history.

(56) References Cited

U.S. PATENT DOCUMENTS

| | | | | |
|---|---|---|---|---|
| 2014/0225919 A1* | 8/2014 | Kaino | .................... | H04N 7/183 345/633 |
| 2015/0235367 A1* | 8/2015 | Langer | .................... | H04N 7/18 348/135 |
| 2015/0243016 A1* | 8/2015 | Moteki | .................... | G06T 7/70 382/103 |
| 2017/0018086 A1* | 1/2017 | Zhang | .................... | H04N 5/232 |

FOREIGN PATENT DOCUMENTS

| | | |
|---|---|---|
| JP | 2014092984 A | 5/2014 |
| JP | 2017011328 A | 1/2017 |

OTHER PUBLICATIONS

Sato, et al., "Camera Parameter Estimation from a Long Image Sequence by Tracking Markers and Natural Features", Systems & Computers in Japan, vol. 35, No. 8, pp. 12-20, Jul.1, 2004, ISSN: 0882-1666, DOI: 10.1002/SCJ.10702, abstract section 2.

Park et al., "Natural Feature Tracking for Extendible Robust Augmented Realities", First IEEE International Workshop on Augmented Reality (IWAR'98), Nov. 1, 1998, XP55209702, San Francisco, CA, Retrieved from http://graphics.usc.edu/cgit/publications/papers/jun-IWAR98.pdf.

Klein, et al., "Parallel tracking and mapping for small AR workspaces", Published in 2007 6th IEEE and ACM International Symposium on Mixed and Augmented Reality, Date of Conference: Nov. 13-16, 2007, https://ieeexplore.ieee.org/abstract/document/4538852/.

Engel, et al., "LSD-SLAM: Large-Scale Direct Monocular SLAM", European Conference on Computer Vision (ECCV), ECCV 2014: Computer Vision—ECCV 2014, pp. 834-849.

* cited by examiner

INFORMATION PROCESSING APPARATUS, INFORMATION PROCESSING METHOD, AND PROGRAM FOR DERIVING A POSITION ORIENTATION OF AN IMAGE PICKUP APPARATUS USING FEATURES DETECTED FROM AN IMAGE

CROSS-REFERENCE TO RELATED APPLICATIONS

This application is a national phase application of international application PCT/JP2016/005165, filed on Dec. 16, 2016, and claims the benefit of, and priority to, Japanese Patent Application No. 2016-009308, filed Jan. 20, 2016 and Japanese Patent Application No. 2016-224576, filed Nov. 17, 2016, which applications are hereby incorporated by reference herein in their entireties.

TECHNICAL FIELD

The present invention relates to a technology for estimating a position or an orientation of a camera.

BACKGROUND ART

A mixed reality (MR) technology and an augmented reality (AR) technology are proposed as a technology for integrating an actual world and a virtual world to each other in real time. These technologies are technologies for integrating an actual space and a virtual space created by a computer to each other without a seam. These technologies are expected to be applied to various fields such as an assembly support for superposing and displaying a work procedure or a wiring state at the time of an assembly work and an operation support for superposing a state of the inside of a body on a body surface of a patient.

An issue of an alignment occurs as one of major issues to be addressed to realize the MR technology. In order that a user feels as if a virtual object actually exists in the actual space, a geometric consistency between the virtual object and the actual space needs to be ensured. That is, the virtual object needs to be regularly observed by the user as if the virtual object exists at a position where the virtual object is supposed to exist in the actual space.

A video see-through type information processing apparatus has been proposed as one of apparatuses that cause an observer to feel as if the virtual object actually exists in the actual space. This apparatus is an apparatus configured to pick up an image of the actual world by a video camera and display a combined image obtained by superposing the virtual object on the image of the actual world on a display unit such as a display in real time to be presented to the observer. In general, a mobile information terminal so-called a tablet terminal including a video camera on its back face, a video see-through type head mounted display (HMD), or the like is used as the above-described information processing apparatus.

In the MR using the video see-through type HMD, the position orientation in the actual space of the camera at the time of the image pickup is measured each time an image is input from the camera built in the HMD. Subsequently, processing is generally performed in a manner that computer graphics (CG) are drawn on the basis of this position orientation of the camera and an intrinsic parameter such as a focal distance, and the CG are superposed on the image of the actual space. For this reason, in the case of the MR using the video see-through type HMD, the issue of the alignment becomes an issue for the measurement of the position orientation in the actual space of the camera built in the HMD.

The measurement of the position orientation of the camera can be performed, for example, by a six-degree-of-freedom physical sensor such as a magnetic sensor, an ultrasonic sensor, or an optical sensor. On the other hand, in a case where the video see-through type HMD is used, image information from the camera built in the video see-through type HMD can be used for the alignment. An alignment method using the image information is widely used because this method is simple and convenient and also at low cost as compared with a method using the physical sensor. According to an alignment technique using the image information, an image of an index where a three-dimensional position in the actual space is already recognized is picked up by the camera, and the position orientation of the camera is estimated on the basis of a correspondence between the position on the picked-up image of the index and the three-dimensional position. The recognized index includes an index artificially arranged in the actual space or the like. As an example, a square marker, a circular marker, a point marker, and the like are exemplified. In PTL 1, arrangement information of the point markers and the square markers is estimated from an image at a high accuracy. However, arrangement of a large number of indices in an actual environment leads to be at high cost in terms of human resources and time, and an issue occurs that a view is also impaired.

In view of the above, natural features such as an edge and a corner point having a luminance gradient on the picked-up image are detected without using the recognized indices, and the position orientation of the camera is estimated on the basis of those natural features.

In NPL 1, a feature point is detected from the image as the natural feature. The camera is moved to two-dimensionally track the feature point from the feature point detected in an initial image, and 8×8 pixel patches around the feature points between the two images including the initial image and the current image are associated with each other. A position corresponding to three-dimensional information of a feature point group associated with a relative position orientation of the camera that has picked up the two images is estimated from a corresponding point of image coordinates. At this time, in NPL 1, the position corresponding to the three-dimensional information of the feature point group and an image patch in the vicinity of the above-described position are collectively referred to as a map. Furthermore, a map calculated from the first two images is referred to as an initial map. The calculated map (feature point group having the three-dimensional position information in this case) is projected onto an image plane on the basis of the current position orientation of the camera, and the position orientation of the camera is updated so as to minimize an error between the detected feature point and the projected feature point. When the position orientation of the camera is estimated and the feature points are sufficiently estimated, an image called a key frame is obtained from a moving image. The feature points detected in the respective key frames are searched for on an epipolar line to perform association. A bundle adjustment is performed on the camera position orientations in the respective key frames and the three-dimensional position of the feature point group so as to minimize projection errors on the respective key frames, and the map is calculated at a high accuracy by a nonlinear optimal calculation.

In NPL 2, a group of points having the luminance gradient are closely detected from the entire image as the natural features. A technique similar to NPL 1 is used for the generation of the initial map. After the generation of the initial map, the position orientation is updated in a manner that a luminance value on the key frame of the point of the map is matched with a luminance value on the current frame when the point of the map is projected on the current image. In addition, the next key frame is added in a case where a position is away from the previous key frame by a threshold or more. An epipolar search of the point of the map in a neighborhood key frame is performed in the added key frame, and association is performed to estimate depth information in the current key frame of the point of the map on the basis of a relative position orientation between the two frames and correspondence information. In NPL 2, the image information of the key frame and depth information of the point having the luminance gradient on the key frame, and the position orientation of the key frame are collectively referred to as a map. At this time, since errors are accumulated when the key frames are sequentially added, the consistency of the entire map is ensured by performing optimization of the map.

NPL 1 and NPL 2 relate to a technology called simultaneous localization and mapping (SLAM). This is a technique for performing localization to estimate the self-position orientation of the camera and mapping to estimate the position of the feature point at the same time.

According to the method of dealing with the patch information around the corner point detected in the image as the natural feature like NPL 1, it is possible to stably estimate the position orientation of the camera in an environment where a large number of corner points that are not repeated patterns can be detected from the image. However, in an environment where it is difficult to detect the corner points such as a case where an image of a floor or a wall hardly having patterns is picked up, an issue occurs that the position orientation of the camera is not stably estimated.

It is possible to apply the technique closely using the points where the luminance gradient can be detected as in NPL 2 to more environments than the technique of NPL 1 since more features can be used as compared with the technique for detecting the corner point as in NPL 1. However, in an environment where it is difficult to detect the luminance gradient such as a case where the image of the floor or the wall hardly having patterns is picked up, the issue still occurs that the position orientation of the camera is not stably estimated.

On the other hand, if even a small number of indices having a high distinctive character such as the square markers or the circular markers can be detected, the position orientation of the camera can be estimated even in a scene where it is difficult to detect the corner points or the natural features such as the luminance gradient or optical flow like a case where the image of the floor or the wall hardly having patterns is picked up. However, in a case where the small number of indices having the high distinctive character are used, an issue occurs that an accuracy of the estimated position orientation of the camera is decreased as compared with the technique using the natural feature in an environment where the large number of features can be detected from the image as in NPL 2. This is because an influence of electric noise included in a digital image or a sampling error included in the digital image is easily affected since the number of features used for the camera position orientation is low.

CITATION LIST

Patent Literature

PTL 1: Japanese Patent No. 4532982

Non Patent Literature

NPL 1: G. Klein, D. Murray, "Parallel tracking and mapping for small AR workspaces", in: Intl. Symp. on Mixed and Augmented Reality (ISMAR), 2007

NPL 2: J. Engel, T. Schops, D. Cremers, "LSD-SLAM: Large-Scale Direct Monocular SLAM", European Conference on Computer Vision (ECCV), 2014

SUMMARY OF INVENTION

An information processing apparatus according to an aspect of the present invention includes, for example, an image obtaining unit configured to obtain an image picked up by an image pickup apparatus, a first position orientation derivation unit configured to derive a position orientation of the image pickup apparatus as a first position orientation on the basis of the first feature detected from the image, a second position orientation derivation unit configured to derive a position orientation of the image pickup apparatus as a second position orientation on the basis of the second feature detected from the image, and an output unit configured to output the position orientation of the image pickup apparatus on the basis of the first position orientation and the second position orientation.

According to the present specification, it is possible to stably estimate the position orientation of the camera.

Further features of the present invention will become apparent from the following description of exemplary embodiments with reference to the attached drawings.

DESCRIPTION OF EMBODIMENTS

First Embodiment

Hereinafter, exemplary embodiments of the present invention will be described with reference to the accompanying drawings.

According to the present exemplary embodiment, in a case where a user wears a head mount display and observes computer graphics (CG), a position and an orientation of a camera (hereinafter, will be referred to as a position orientation) are accurately estimated, and the CG are accurately drawn on the basis of the estimated position orientation. Subsequently, a combined image obtained by combining the CG and an image pickup up by the camera with each other is displayed on the head mount display mounted to the user. In the present specification, the position orientation refers to a set of six parameters including three parameters representing a position and three parameters representing its orientation (attitude).

The information processing apparatus according to the first exemplary embodiment detects both first features and second features from an image picked up by the camera in a technique for estimating the position orientation of the camera. Subsequently, a first position orientation of the camera is estimated on the basis of the first features, and a second position orientation of the camera is estimated on the basis of the second features. Subsequently, a determination on an output of the position orientation of the camera is performed on the basis of the estimated first position orientation and the estimated second position orientation, and one of the position orientations is output.

Figure 7:
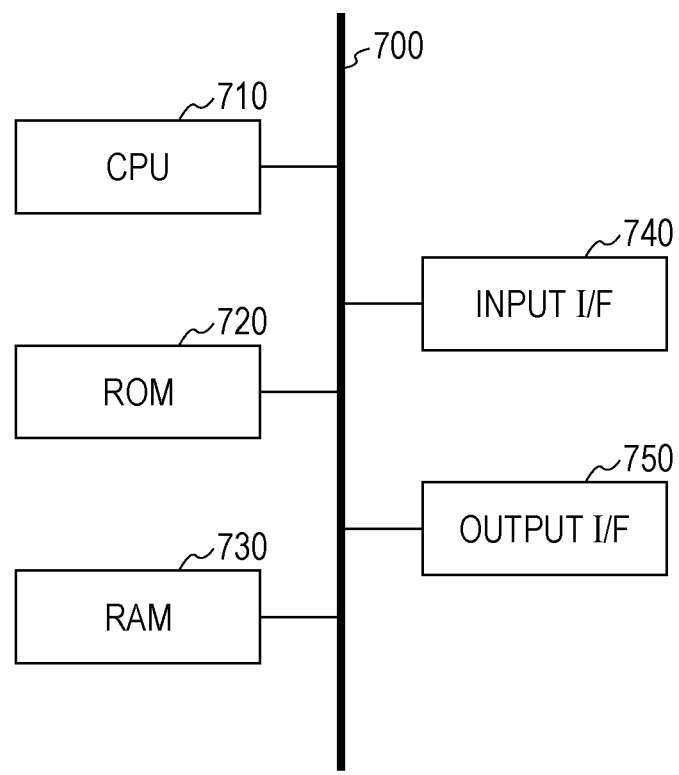
FIG. 7 illustrates a hardware configuration example according to the first exemplary embodiment.

FIG. 7 is a hardware configuration diagram of an information processing apparatus 1000 according to the present exemplary embodiment. In FIG. 7, a CPU 710 controls respective devices connected to one another via a bus 700. The CPU 710 reads out and executes a processing step or a program stored in a read-only memory (ROM) 720. Respective processing programs represented by an operating system (OS), a device driver, and the like according to the present exemplary embodiment are stored in the ROM 720, temporarily stored in a random access memory (RAM) 730, and appropriately executed by the CPU 710. An input interface (I/F) 740 inputs a signal from an external apparatus (such as a display apparatus or an operation apparatus) as an input signal in such a format that the signal can be processed by the information processing apparatus 1000. An output interface (I/F) 750 outputs a signal to the external apparatus (display apparatus) as an output signal in such a format that the signal can be processed by the display apparatus.

Figure 1:
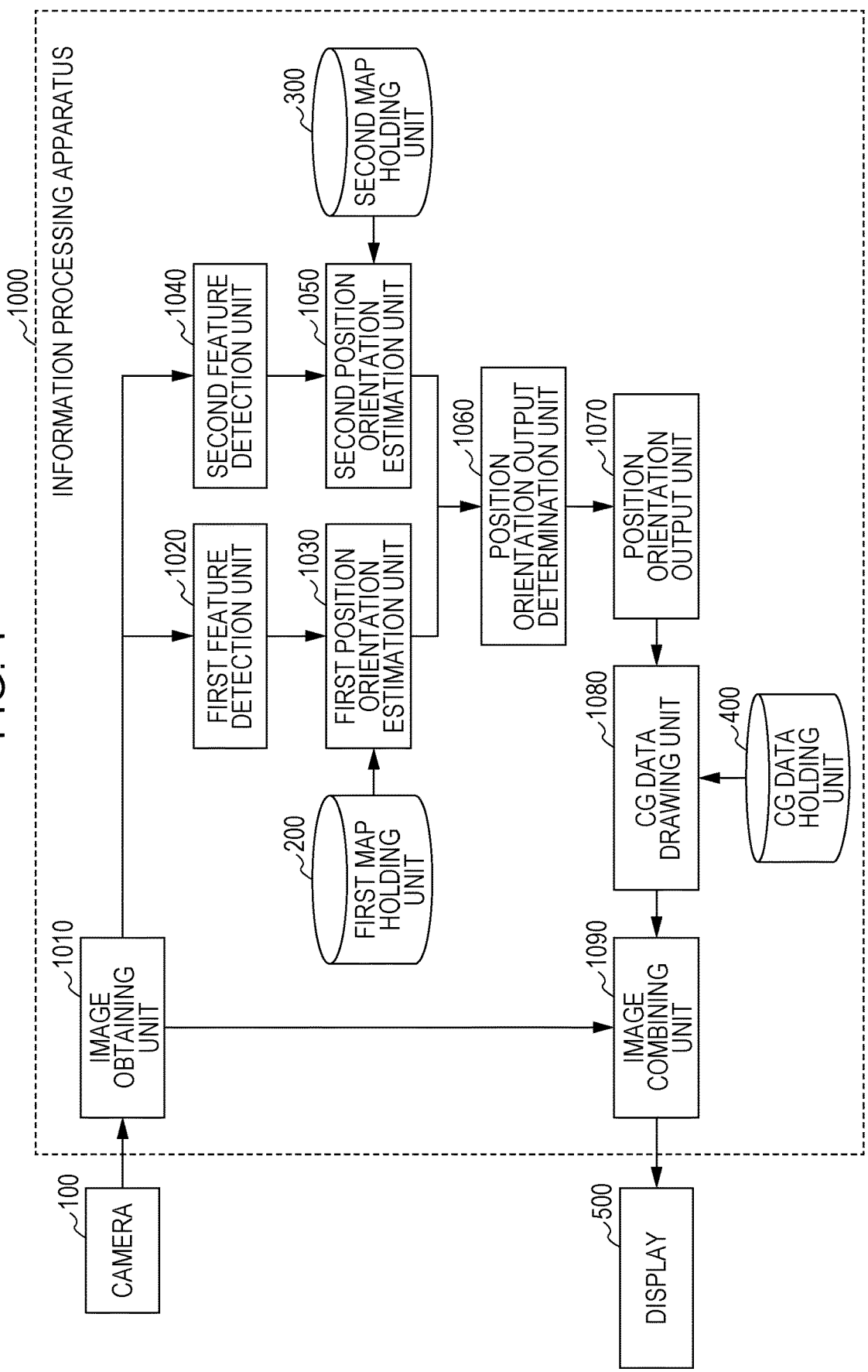
FIG. 1 is a function block diagram illustrating a configuration of an information processing apparatus according to a first exemplary embodiment.

FIG. 1 is a block diagram of the information processing apparatus 1000 according to the present exemplary embodiment.

The information processing apparatus 1000 is constituted by an image obtaining unit 1010, a first feature detection unit 1020, a first position orientation estimation unit 1030, a second feature detection unit 1040, a second position orientation estimation unit 1050, a position orientation output determination unit 1060, a position orientation output unit 1070, a CG data drawing unit 1080, an image combining unit 1090, a first map holding unit 200, a second map holding unit 300, and a CG data holding unit 400.

The information processing apparatus 1000 is connected to a camera 100. According to the present exemplary embodiment, the information processing apparatus 1000 is connected to the camera and a display 500 in a wired or wireless manner.

The camera 100 is built in or externally attached to the head mount display mounted to the head part of the user. For example, a video camera that continuously picks up moving images as a frame image or a digital camera is used as the camera 100.

The display 500 is the head mount display (HMD) and displays CG data drawn by the CG data drawing unit 1080. The display 500 may be a liquid crystal display or an organic electroluminescence (EL) display, and any mode may be adopted as long as the image combined with the CG can be displayed. The image obtaining unit 1010 continuously obtains the images picked up by the camera 100. The image obtaining unit 1010 is realized by an analog video capture board when an output of the camera is an analog output such as National Television System Committee (NTSC) system. On the other hand, when the output of the camera is a digital output such as IEEE1394, for example, the image obtaining unit 1010 is realized by an IEEE1394 interface board. In addition, digital data of still images or moving images previously stored in a storage device may be read out. The obtained images are input to the first feature detection unit 1020.

The first feature detection unit 1020 detects the first features from each of the images continuously obtained by the image obtaining unit 1010. Although detailed processing will be described below, a feature point having a luminance gradient is detected as the first feature according to the present exemplary embodiment.

The first map holding unit 200 holds a previously generated first map.

The first position orientation estimation unit 1030 estimates the first position orientation of the camera (position orientation derivation) by using the features detected by the first feature detection unit 1020 and the first map obtained from the first map holding unit 200. An estimation method will be described below.

The second map holding unit 300 holds a previously generated second map.

The second feature detection unit 1040 detects the second features from each of the images continuously obtained by the image obtaining unit 1010. Although detailed processing will be described below, a rectangular index having identification information is detected as the second feature according to the present exemplary embodiment.

The second position orientation estimation unit 1050 estimates the second position orientation of the camera (position orientation derivation) by using the features detected by the second feature detection unit 1040 and the second map obtained from the second map holding unit 300. The estimation method will be described below.

The position orientation output determination unit 1060 determines whether to output either or both of the first position orientation estimated by the first position orientation estimation unit 1030 and the second position orientation estimated by the second position orientation estimation unit 1050. A determination method will be described below.

The position orientation output unit 1070 outputs the camera position orientation determined by the position orientation output determination unit 1060.

The CG data holding unit 400 holds the CG data to be drawn. Any format of the CG data may be used as long as the CG data can be rendered as a CG image.

The CG data drawing unit 1080 obtains the CG data to be drawn from the CG data holding unit 400 and sets the camera position orientation output by the position orientation output unit 1070 as a virtual position orientation of the camera to draw the CG data. The CG data is combined on the image obtained by the camera 100 to be drawn, and the combined image is presented to the user, so that the mixed reality can be realized. In a case where only the CG data is drawn, the virtual reality can be realized.

The image combining unit 1090 generates a combined image by combining the image obtained by the image obtaining unit 1010 and the CG data drawn by the CG data drawing unit 1080 with each other. Subsequently, the combined image is output to the display 500 (display control).

These respective function units are realized while the CPU 710 expands the program stored in the ROM 720 onto the RAM 730 and executes processings in accordance with respective flow charts which will be described below. In a case where hardware is constituted as a substitute of software processing using the CPU 710, for example, a calculation unit or a circuit may be constituted so as to correspond to the processings of the respective function units described herein.

According to the present exemplary embodiment, a coordinate system for defining the position orientation of the camera (in this case, a coordinate system in which one point in an environment is defined as an origin, and three axes mutually orthogonal to one another are respectively defined as an X axis, a Y axis, and a Z axis) is referred to as a world coordinate system. The world coordinate system may also be defined while a plurality of features where positions are already known in an environment are used as references. Alternatively, the world coordinate system may be determined while the position and the orientation at a time when the camera performs the image pickup for the first time are used as the references, or positions of respective peaks constituting each of the indices arranged in the environment may be already recognized. A scale may be determined on the basis of the feature or the index where the position is already recognized. Alternatively, the scale of the world coordinate system may be determined on the basis of already recognized image pickup positions when the image pickup has been performed at a plurality of points.

In addition, according to the exemplary embodiment of the present invention, camera internal parameters such as a distortion correction coefficient of the camera, a focal distance, and a principal position have been already calibrated by a related-art technique.

Figure 2:
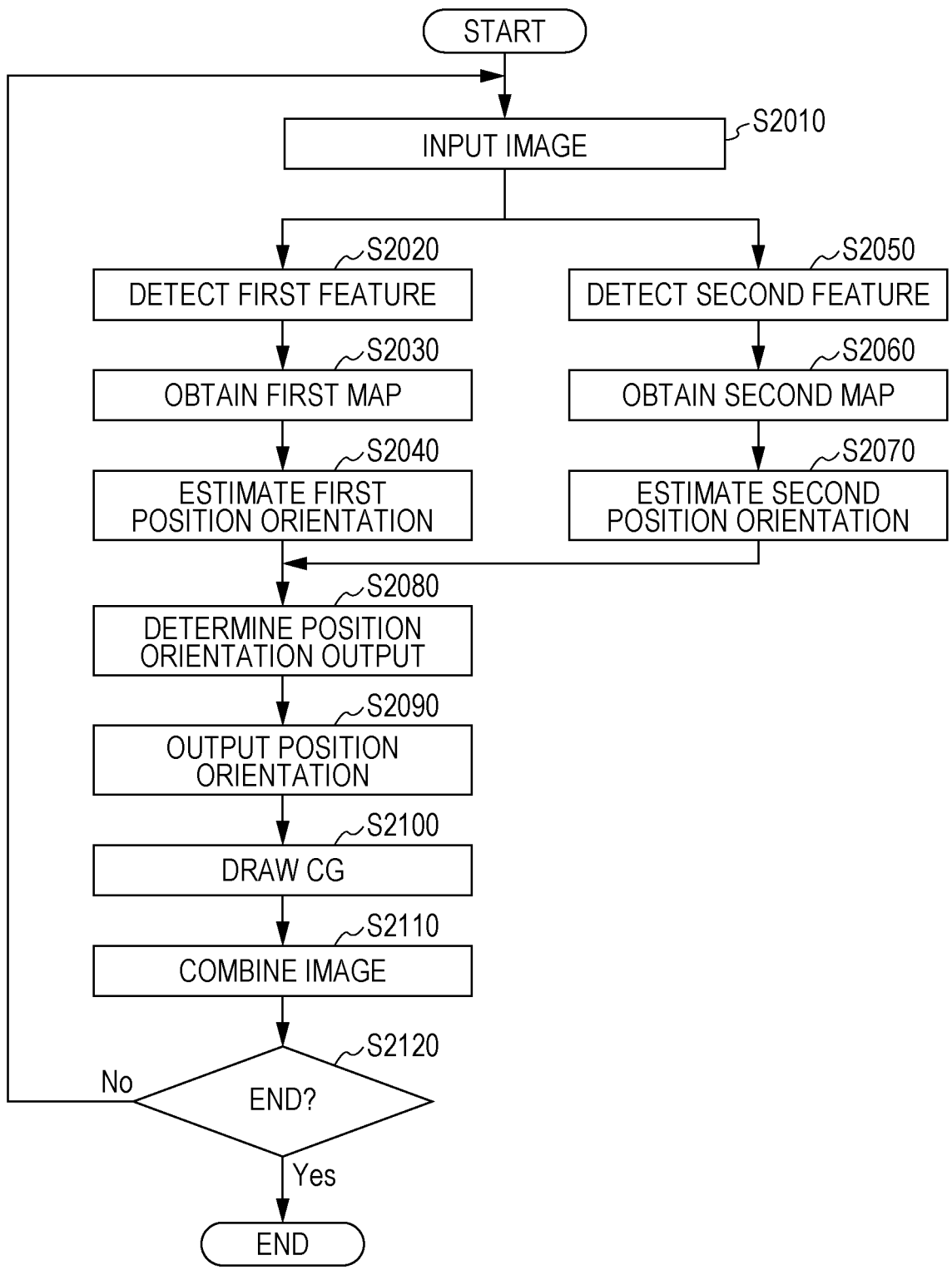
FIG. 2 is a flow chart illustrating a flow of processing of the information processing apparatus according to the first exemplary embodiment.

Next, a processing procedure of the information processing apparatus 1000 according to the present exemplary embodiment will be described. FIG. 2 is a flow chart illustrating the processing procedure of the information processing apparatus 1000 according to the present exemplary embodiment.

In step S2010, the image obtaining unit 1010 obtains an image picked up by the camera 100.

In step S2020, the first feature detection unit 1020 performs first feature detection with respect to the image obtained in step S2010. The detection of the feature point means that the image coordinates in the image of the feature point are detected.

Here, processing of detecting the feature point corresponding to the first feature from the image will be described. A point having the luminance gradient that is higher than or equal to a threshold between neighboring pixels is set as the feature point. The luminance gradient is a change amount of densities of adjacent pixels on the image, and a point where the luminance gradient changes by a value higher than or equal to the threshold is set as the feature point. The detection of the luminance gradient is performed by a related-art edge detection operator such as, for example, Sobel operator or Prewitt operator. With regard to the respective pixels, the edge detection operator is applied in a horizontal direction and a vertical direction of the image. Subsequently, an edge intensity is calculated on the basis of an output value. In a case where an output value in the horizontal direction of the edge detection operator is set as fx, and an output value in the vertical direction of the edge detection operator is set as fy, an edge intensity I in the pixel is calculated as represented by Expression (1).

[Math.1]

$$I=\sqrt{(f_x^2+f_y^2)} \qquad (1)$$

With the above-described processing, the image coordinates of the feature point (pixel (point) having the luminance gradient in the image)) and the luminance value of the pixel (point) are obtained. In the case of an image obtained by performing the image pickup in a room, various elements such as pixels corresponding to a line segment of an object like a table and a chair present in the room and pixels representing textures of a floor are detected as the feature points. In the case of an image obtained by performing the image pickup in the open air, pixels and the like corresponding to a window of a building and a trade sign and a line segment of a character included in the trade sign are detected as the feature points.

In step S2030, the first position orientation estimation unit 1030 obtains the first map 200 corresponding to the first feature. According to the present exemplary embodiment, a depth value of the feature point (first feature) extracted from each of a plurality of images, the luminance value of the feature point, and the position orientation of the camera at a time when the image is picked up are held while being associated with one another as the first map corresponding to the first feature which is held by the first map holding unit 200. The depth value of the feature point can be estimated by performing the association of the coordinates on the image, for example. For example, the feature points are tracked from images picked up while the position is changed in a time series manner by a feature tracking technique called KLT, and the association of the feature points between the plurality of images is performed. A transformation matrix called an E matrix (basic matrix) is estimated from the association of the obtained feature points between the plurality of images, and the position orientation of the camera is obtained from the E matrix. Then, three-dimensional information of the position or depth of the feature point is estimated by a stereo method on the basis of a relative position orientation between the plurality of images. As the first map held by the first map holding unit 200, the estimated depth value of the feature point may be the three-dimensional position in the world coordinate system or the depth value from the positions where the images are picked up by the respective cameras. In the present specification, the respective images used to estimate the first map are referred to as key frames.

In step S2040, the first position orientation estimation unit 1030 estimates the position orientation of the camera (the first position orientation) on the basis of the feature point detected in step S2020 and the first map obtained in step S2030. Any related-art techniques for estimating the camera position orientation on the basis of the first map may be used as long as the camera position orientation is estimated from the first feature according to the technique as in NPL 1 and NPL 2.

First, the feature point included in the map obtained in step S2030 is projected onto the image input in step S2010 on the basis of the initial value of the first position orientation of the camera. The position orientation obtained in the previous frame image may be used as the initial value of the position orientation. As the projected feature point, for example, the feature point associated with the position orientation closest to the position orientation of the camera at a time when the latest image in the time series manner is picked up may be selected and projected. Subsequently, the position orientation having the initial value is updated such that the luminance value of the projected feature point (which is held in the first map) is matched with the luminance value at the position of the projected feature point on the basis of the luminance value around the position in the image of the projected feature point to estimate the position orientation of the camera.

At this time, since the position orientation of the camera estimated by the first position orientation estimation unit 1030 is used for the CG drawing as the viewpoint of the virtual camera in the mixed reality or the virtual reality, real-time processing is demanded in accordance with the movement of the user. For this reason, after the initial three-dimensional information is generated, the first map generation that causes high processing load and the first camera position orientation estimation that causes relatively low processing load are processed in parallel with each other. The first position orientation estimation unit 1030 estimates the camera position orientation on the basis of the first feature and the first three-dimensional information, and an camera position orientation estimation result is then output to the position orientation output determination unit 1060 for the camera.

In step S2050, the second feature detection unit 1040 performs the second feature detection on the image obtained in step S2010. Herein, according to the present exemplary embodiment, a square index is detected as the second feature. In the present specification, a difference between the first feature and the second feature resides in that at least the second feature has the identification information. Hereinafter, the square index corresponding to one of the examples of the second feature will be described.

Figure 3A:
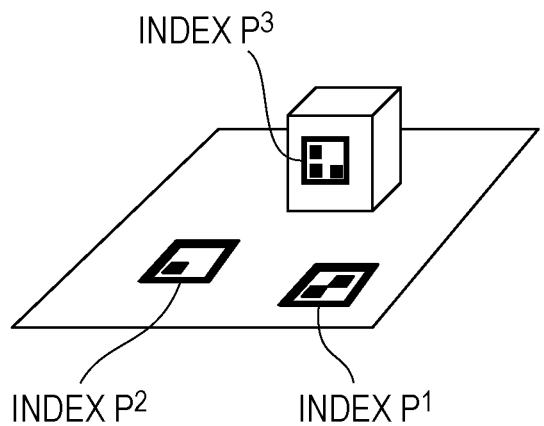
FIG. 3A is an explanatory diagram for describing square indices corresponding to second features according to the first exemplary embodiment.
Figure 3B:
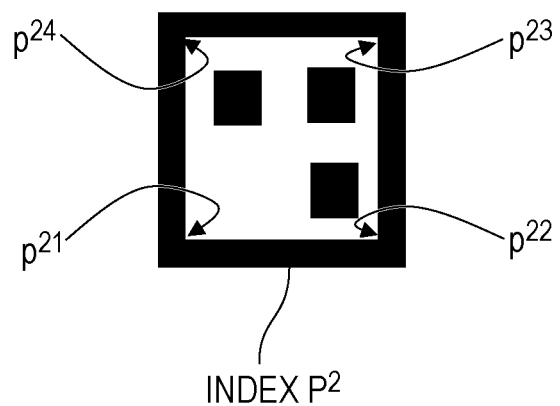
FIG. 3B is an explanatory diagram for describing the square index corresponding to the second feature according to the first exemplary embodiment.

A plurality of indices having a square shape as illustrated in FIG. 3A (hereinafter, will be referred to as a square index) are arranged in an environment or on a target object. Herein, the arranged indices are represented as $P^k$ (k=1, ..., $K_o$). It should be noted however that $K_o$ denotes the number of the arranged indices ($K_o$=3 in the example of FIG. 3A). As illustrated in FIG. 3B, the square index has a pattern representing an identifier inside thereof and can be uniquely identified. In addition, the square index $P^k$ is constituted by peaks $p^{ki}$ (i=1, ..., $N_k$). It should be noted however that $N_k$ denotes the total number of peaks constituting the square index $P^k$ ($N_k$=4 since the index is the square index in the case of the present exemplary embodiment). The second feature detection unit 1040 applies binary processing to the picked-up image and thereafter performs labeling processing to extract an area formed by four straight lines from among areas having a certain area or larger as an index candidate. Furthermore, it is determined whether or not a particular pattern exists in a candidate area to determine whether or not the candidate area is an index area. Then, the internal pattern is read out, and a direction and the identifier in the image of the index are obtained, so that the index is detected from the obtained image. The square index is detected as the second feature in the above-described manner. The square index corresponding to the second feature is previously arranged in the actual space by the user itself or another user.

Figure 3C:
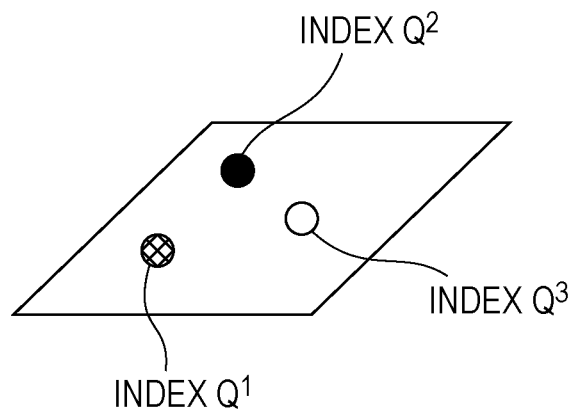
FIG. 3C is an explanatory diagram for describing circular indices having mutually different colors corresponding to the second features according to the first exemplary embodiment.

It should be noted that the second feature arranged in the environment or on the target object is not limited to the square index, and any mode may be adopted as long as the index can be detected on the picked-up image and also the index can be obtained in a detection method different from detection method for the first feature. For example, as illustrated in FIG. 3C, the indices have circular features respectively having different colors. In this case, areas corresponding to the respective feature colors are detected from the image, and barycentric positions thereof are set as detection coordinates of the features. In addition, the feature points (natural feature points) having mutually different texture features may be set as the second features. In this case, the second features are detected from the image while template matching using template images having the respective features previously held as already recognized information is applied onto the image. Moreover, features having identifiers such as SIFT features which can be identified can be used as the second features. The features are not limited to the above, and any features may be used as long as the features are fixed in the space and can be detected from the image obtained by the image pickup of the features. In addition, according to the present exemplary embodiment, the number of the second features is set to be lower than the number of the first features.

In step S2060, the second map corresponding to the second feature is obtained. According to the present exemplary embodiment, since the point indices or the square indices are used as the second features, the second map is three-dimensional arrangement information of the point indices or the square indices. The arrangement information of the point indices or the square indices can be estimated by using the technology as described in PTL 1. Alternatively, the arrangement information may be previously accurately measured by using surveying instrument or the like used in the field of photographic surveying, or a value manually measured by using a measuring tape, a protractor, or the like. In addition, the three-dimensional position may be obtained on the basis of triangular surveying from the image coordinates of the peaks of the square detected on two images, and the arrangement information may be obtained on the basis of the positions of the four peaks. The method of estimating the second map corresponding to the arrangement information of the second features is not limited to the above, and the second map may be estimated by using any related-art technologies.

In step S2070, the position orientation of the camera is estimated from the second features and the second map. Hereinafter, descriptions will be given of a case where reference coordinates are defined, and the position orientation of the camera in the reference coordinates is estimated.

Figure 4:
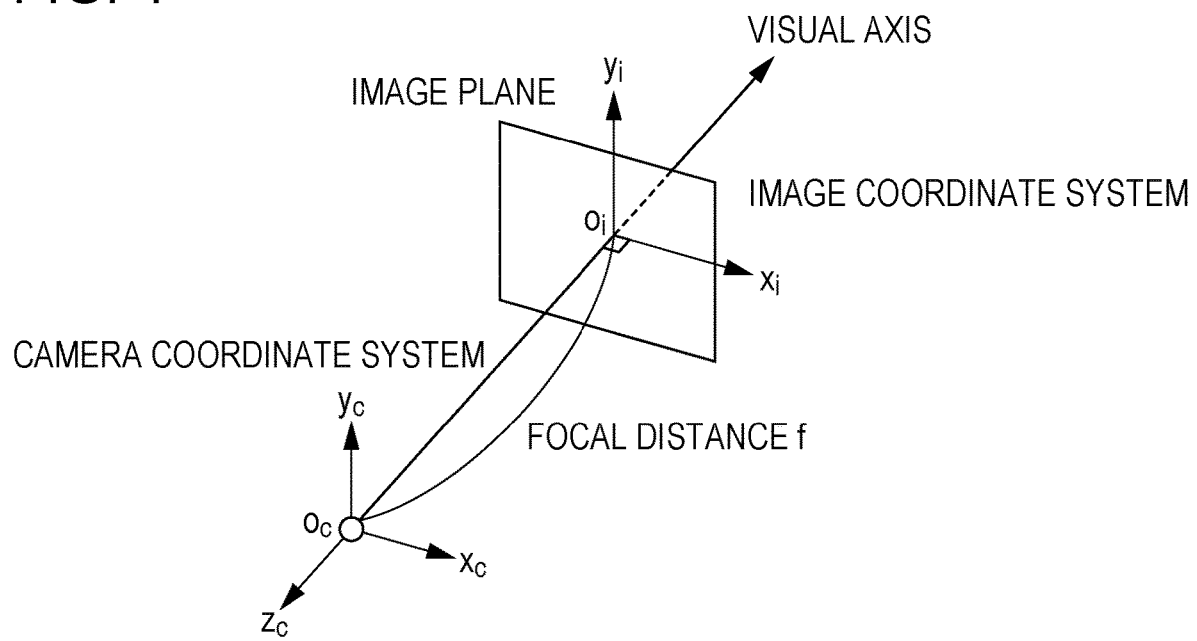
FIG. 4 is an explanatory diagram for describing a camera coordinate system and an image coordinate system.

First, perspective projection transformation will be described. FIG. 4 is an explanatory diagram for describing a camera coordinate system and an image coordinate system. An origin $o_i$ of the image coordinate system is set as an intersecting point of a view axis and an image plane, the horizontal direction of the image is set as an $x_i$ axis, and the vertical direction is set as a $y_i$ axis. A distance (focal distance) between the origin $o_c$ and the image plane in the camera coordinate system is set as f, a $z_c$ axis in the camera coordinate system is set to be in an opposite direction of the view axis, an $x_c$ axis is set to be parallel with the horizontal direction of the image, and a $y_c$ axis is set to be parallel with the vertical direction of the image.

A point $x_c=[x_c y_c z_c]^t$ on the camera coordinate system is projected onto a point where the screen coordinates correspond to $u=[u_x u_y]^t$ as in Expression (2) by the perspective projection transformation.

[Math.2]

$$u_x = -f \frac{x_c}{z_c} \quad (2)$$
$$u_y = -f \frac{y_c}{z_c}$$

Figure 5:
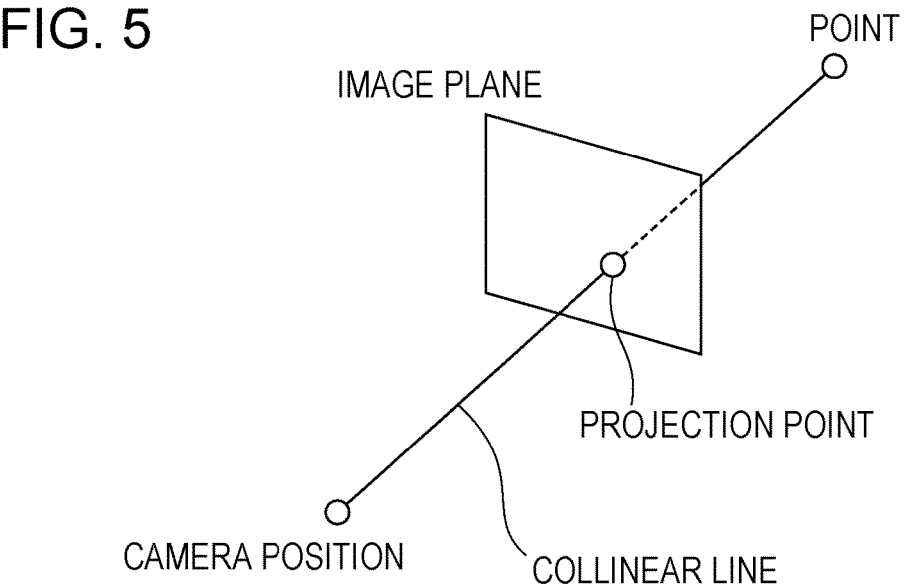
FIG. 5 is an explanatory diagram for describing a collinear condition expression.

According to the present exemplary embodiment, it is assumed that lens distortion does not exist or is corrected, and it is supposed that the camera is a pinhole camera. As illustrated in FIG. 5, Expression (2) indicates that the point in the space, the projection point on the image of the above-described point, and the camera position (viewpoint) exist on the same straight line, which is also referred to as a collinear condition expression.

A position of the camera in the reference coordinates is set as $t=[t_x t_y t_z]^t$, and an orientation of the camera (in actuality, the orientation of the reference coordinates with respect to the camera coordinate system) is set as $\omega=[\omega_x \omega_y \omega_z]$. $\omega$ is a three-degree-of-freedom orientation representing method, and the orientation is represented by a rotation axis vector and a rotation angle. When the rotation angle is set as $r_a$, $r_a$ is represented as Expression (3) based on $\omega$.

[Math.3]

$$r_a = \sqrt{\omega_x^2 + \omega_y^2 + \omega_z^2} \quad (3)$$

When the rotation axis vector is set as $r=[r_x r_y r_z]^t$, a relationship between $r$ and $w$ is represented as Expression (4).

[Math.4]

$$[\omega_x, \omega_y, \omega_z] = [r_a r_x, r_a r_y, r_a r_z] \quad (4)$$

A relationship between $\omega$ (the rotation angle $r_a$, the rotation axis vector $r$) and a 3×3 rotation transformation matrix $R$ is represented as Expression (5).

[Math.5]

$$R = \begin{bmatrix} R_{11} & R_{12} & R_{13} \\ R_{21} & R_{22} & R_{23} \\ R_{31} & R_{32} & R_{33} \end{bmatrix} \quad (5)$$

$$= \begin{bmatrix} r_x^2(1-\cos r_a) + \cos r_a & r_x r_y(1-\cos r_a) - r_z \sin r_a & r_z r_x(1-\cos r_a) + r_y \sin r_a \\ r_x r_y(1-\cos r_a) + r_z \sin r_a & r_y^2(1-\cos r_a) + \cos r_a & r_y r_z(1-\cos r_a) + r_x \sin r_a \\ r_z r_x(1-\cos r_a) + r_y \sin r_a & r_y r_z(1-\cos r_a) + r_x \sin r_a & r_z^2(1-\cos r_a) + \cos r_a \end{bmatrix}$$

The camera coordinates $x_c$ of the point $x_w=[x_w y_w z_w]^t$ on the reference coordinates is represented as Expression (6) using $t$ and $R$.

[Math.6]

$$\begin{bmatrix} x_c \\ y_c \\ z_c \end{bmatrix} = R \begin{bmatrix} x_w - t_x \\ y_w - t_y \\ z_w - t_z \end{bmatrix} = \begin{bmatrix} R_{11} & R_{12} & R_{13} \\ R_{21} & R_{22} & R_{23} \\ R_{31} & R_{32} & R_{33} \end{bmatrix} \begin{bmatrix} x_w - t_x \\ y_w - t_y \\ z_w - t_z \end{bmatrix} \quad (6)$$

From Expressions (2) and (6), the point $x_w=[x_w y_w z_w]^t$ on the reference coordinates is projected onto the point $u=[u_x u_y]^t$ on the image by the perspective projection transformation as in Expression (7).

[Math.7]

$$u_x = -f \frac{x_c}{z_c} = -f \frac{R_{11}(x_w-t_x) + R_{12}(y_w-t_y) + R_{13}(z_w-t_z)}{R_{31}(x_w-t_x) + R_{32}(y_w-t_y) + R_{33}(z_w-t_z)} \quad (7)$$
$$u_y = -f \frac{y_c}{z_c} = -f \frac{R_{21}(x_w-t_x) + R_{22}(y_w-t_y) + R_{23}(z_w-t_z)}{R_{31}(x_w-t_x) + R_{32}(y_w-t_y) + R_{33}(z_w-t_z)}$$

Ideally, the projection position (calculation position) calculated from Expression (7) on the basis of $t$, $\omega$, and $x_w$ is matched with the position where the observation is actually performed (observation position). For this reason, in a case where a shift in the horizontal direction of the image between the calculation position and the observation position is set as $F$, a shift in the vertical direction is set as $G$, and the observation position is set as $v_o=[v_{ox} v_{oy}]^t$, $F$ and $G$ become 0 as illustrated in Expression (8).

[Math.8]

$$F = -f \frac{R_{11}(x_w-t_x) + R_{12}(y_w-t_y) + R_{13}(z_w-t_z)}{R_{31}(x_w-t_x) + R_{32}(y_w-t_y) + R_{33}(z_w-t_z)} - v_{ox} = 0 \quad (8)$$

$$G = -f \frac{R_{21}(x_w-t_x) + R_{22}(y_w-t_y) + R_{23}(z_w-t_z)}{R_{31}(x_w-t_x) + R_{32}(y_w-t_y) + R_{33}(z_w-t_z)} - v_{oy} = 0$$

$F$ and $G$ are functions related to the camera position $t$, the camera orientation $\omega$, and the position $x_w$ of the point on the reference coordinates corresponding to the observation target. In a case where the observation target is the feature point, as illustrated in Expression (9), $F$ and $G$ becomes the functions related to the camera position $t$, the camera orientation $\omega$, and the position $x_w$ in the reference coordinates of the feature point.

[Math.9]

$$F(t_x, t_y, t_z, \omega_x, \omega_y, \omega_z, x_w, y_w, z_w) = 0$$

$$G(t_x, t_y, t_z, \omega_x, \omega_y, \omega_z, x_w, y_w, z_w) = 0 \quad (9)$$

Expression (10) is obtained by linearizing Expression (9). $\Delta t_x$, $\Delta t_y$, and $\Delta t_z$ represent the positions of the camera, and $\Delta \omega_x$, $\Delta w_y$, and $\Delta \omega_z$ represent correction amounts with respect to an approximate value of the orientation of the camera.

[Math.10]

$$F^0 + \frac{\partial F}{\partial t_x}\Delta t_x + \frac{\partial F}{\partial t_y}\Delta t_y + \frac{\partial F}{\partial t_z}\Delta t_z + \qquad (10)$$
$$\frac{\partial F}{\partial \omega_x}\Delta \omega_x + \frac{\partial F}{\partial \omega_y}\Delta \omega_y + \frac{\partial F}{\partial \omega_z}\Delta \omega_z = 0$$
$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta \omega_x +$$
$$\frac{\partial G}{\partial \omega_y}\Delta \omega_y + \frac{\partial G}{\partial \omega_z}\Delta \omega_z = 0$$

Where $F^0$ and $G^0$ in Expression (10) denote a difference between the calculation position of the projection position at a time when the position and the orientation of the camera and the position of the feature point are assigned to F and G in Expression (8) and the observation position $v_o$. Expression (10) is an observation equation with regard to one feature point observed on a certain image.

On the other hand, in the case of the square index, representation is made by using the position $t_m = [t_{mx} t_{my} t_{mz}]^t$ in the reference coordinates and the orientation $\omega_m = [\omega_{mx} \omega_{my} \omega_{mx}]$ (the 3×3 rotation transformation matrix corresponding to $\omega_m$ is set as $R_m$) with respect to the reference coordinates. A position in a first index coordinate system of the peak of the square is set as $x_m = [x_m y_m 0]^t$. A position $x_w$ in a the reference coordinates of the peak of the square index becomes a function related to $t_m$ and $\omega_m(R_m)$ as in Expression (11).

[Math.11]

$$\begin{bmatrix} x_w \\ y_w \\ z_w \\ 1 \end{bmatrix} = \begin{bmatrix} R_m & t_m \\ 0 & 1 \end{bmatrix} \begin{bmatrix} x_m \\ y_m \\ 0 \\ 1 \end{bmatrix} = \begin{bmatrix} R_{m11} & R_{m12} & R_{m13} & t_{mx} \\ R_{m21} & R_{m22} & R_{m23} & t_{my} \\ R_{m31} & R_{m32} & R_{m33} & t_{mz} \\ 0 & 0 & 0 & 1 \end{bmatrix} \begin{bmatrix} x_m \\ y_m \\ 0 \\ 1 \end{bmatrix} \qquad (11)$$

For this reason, as illustrated in Expression (12), F and G also become functions of the camera position t, the camera orientation $\omega$, the position $t_m$ of the square index and the orientation $\omega_m$ of the square index.

[Math.12]

$$F(t_x, t_y, t_z, \omega_x, \omega_y, \omega_z, t_{mx}, t_{my}, t_{mz}, \omega_{mx}, \omega_{my}, \omega_{mz}) = 0$$
$$G(t_x, t_y, t_z, \omega_x, \omega_y, \omega_z, t_{mx}, t_{my}, t_{mz}, \omega_{mx}, \omega_{my}, \omega_{mz}) = 0 \qquad (12)$$

Expression (12) is a non-linear equation with regard to the position and the orientation of the camera and the position and the orientation of the square index. In view of the above, linearization is performed in the vicinity of approximate values of the position and the orientation of the camera and the position and the orientation of the square index by using Tayler expansion up to the first term, and the position and the orientation of the camera and the position and the orientation of the index are obtained by iterative calculation.

Expression (13) is obtained by linearizing Expression (12). $\Delta t_x$, $\Delta t_y$, and $\Delta t_z$ represent correction amounts with respect to the approximate value of the position of the camera, and $\Delta \omega_x$, $\Delta \omega_y$, and $\Delta \omega_z$ represent correction amounts with respect to the approximate value of the orientation of the camera.

[Math.13]

$$F^0 + \frac{\partial F}{\partial t_x}\Delta t_x + \frac{\partial F}{\partial t_y}\Delta t_y + \frac{\partial F}{\partial t_z}\Delta t_z + \qquad (13)$$
$$\frac{\partial F}{\partial \omega_x}\Delta \omega_x + \frac{\partial F}{\partial \omega_y}\Delta \omega_y + \frac{\partial F}{\partial \omega_z}\Delta \omega_z = 0$$
$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta \omega_x +$$
$$\frac{\partial G}{\partial \omega_y}\Delta \omega_y + \frac{\partial G}{\partial \omega_z}\Delta \omega_z = 0$$

Where $F^0$ and $G^0$ in Expression (13) denote errors between the calculation position of the projection position at a time when the position and the orientation of the camera and the position of the square index are assigned to F and G in Expression (8) and the observation position $v_o$.

The approximate value of the position and the orientation of the camera is obtained from a correspondence relationship between the point where the position in the reference coordinates is already recognized and the projection position on the image of the point. In a case where the point where the position in the reference coordinates is already recognized is used, the point where the position is already recognized exists in a scene.

Expression (13) is an observation equation with regard to one peak of a square index observed on a certain image. Since peaks of a plurality of square indices are actually observed on a plurality of images, a plurality of Expressions (13) are obtained. In a case where the number of square indices detected from the image is $D_J$, a set of $(4 \times D_J)$ observation equations (13), that is, $2 \times (4 \times D_J)$ observation equations are established. When constant terms $F_0$ and $G_0$ in the left term of the observation equations of Expressions (13) are moved to the right term to establish a simultaneous equations, this simultaneous equations can be written as Expression (14).

[Math.14]

$$J\Delta = E \qquad (14)$$

Since unrecognized values are six parameters of the position and the orientation of the camera, the number of rows of a Jacobian matrix J is $2 \times (4 \times D_J)$ corresponding to the number of the observation equations. The number of columns of the Jacobian matrix J is six. $\Delta$ represents all correction values by way of a vector and is referred to as a correction value vector. The number of elements of the correction value vector is six corresponding to the number of unrecognized values. E represents all errors aligned by way of a vector and is referred to as an error vector. The error vector has $-F_0$ and $-G_0$ corresponding to a difference between the calculation position of the projection position based on the approximate value and the observation position as the elements. The number of elements of E is $2 \times (4 \times D_J)$ corresponding to the number of the observation equations.

It should be noted that the images of the point indices where the position in the reference coordinates is already recognized or the square indices where the position and the orientation are already recognized are picked up at the same time, so that it is possible to explicitly specify the origin of the reference coordinates, the scale, and the orientation. In the equation of Expression (14) with regard to these indices, values of the position of the index and a partial differential coefficient with regard to the index become all zero. To explicitly specify the origin of the reference coordinates, the scale, and the orientation, when the second feature is the point index, three point indices where the position is already recognized may be used. When the second feature is the square index, one square index where the position and the orientation are already recognized may be used.

The approximate value is repeatedly corrected by the correction value Δ obtained as a solution of the simultaneous equation to obtain the position and the orientation of the camera. The solution may be obtained by using solution methods based on any other related-art simultaneous linear equation such as a row reduction method, Gauss-Jordan method, or a conjugate gradient method as a solution method for the simultaneous equation. In a case where the number of obtained image is high or a case where the number of detected indices is high, the calculation can be performed at a high speed on the basis of a preconditioned conjugate gradient method in which incomplete Cholesky decomposition is performed in preprocessing or the like.

The unrecognized parameters with regard to the position and the orientation of the camera are collectively represented as a state vector $t_0$. The correction is performed as in Expression (15) by using the estimated correction value Δ, and the obtained value is set as a new state vector t.

[Math.15]

$$t_0 + \Delta \rightarrow t \quad (15)$$

It is determined whether or not the calculation is convergent by using a determination reference on whether or not the error vector E is lower than a predetermined threshold or whether or not the correction value Δ is lower than a predetermined threshold. In a case where the calculation is convergent, the positions and the orientations of the plurality of square indices are determined by using the state vector at this time. In a case where the calculation is not convergent, the correction value is repeatedly obtained until the calculation is convergent. At this time, the corrected state vector t after the correction is used as the next $t_0$.

The second position orientation is obtained in the above-described manner, and the second position orientation estimation unit 1050 outputs the second position orientation to the position orientation output determination unit 1060.

Figure 6:
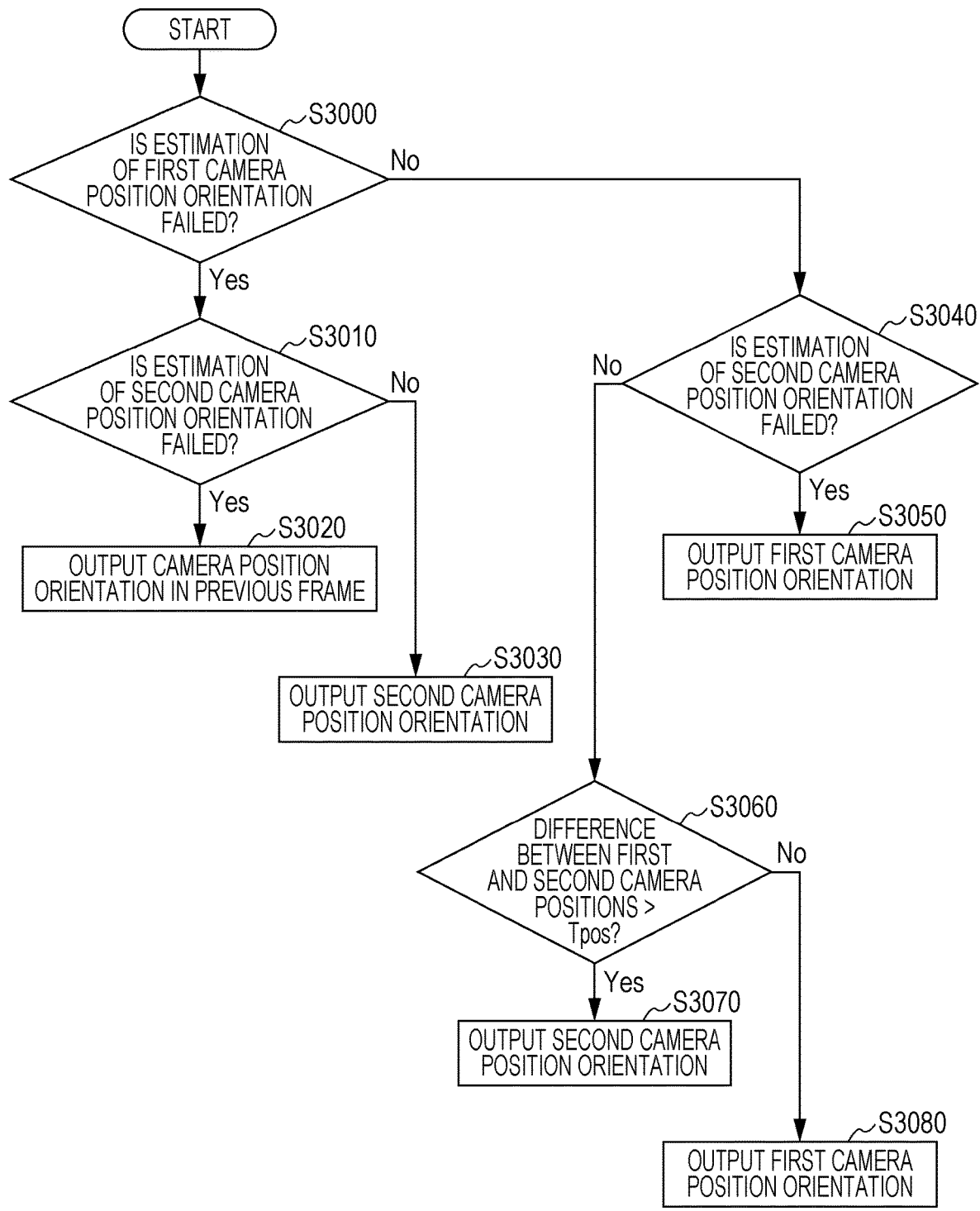
FIG. 6 is a flow chart illustrating a processing procedure of a position orientation output determination unit according to the first exemplary embodiment.

In step S2080, the position orientation output determination unit 1060 determines whether or not one or both of the first position orientation and the second position orientation are output. Hereinafter, the determination processing by the position orientation output determination unit 1060 will be described with reference to a flow chart illustrated in FIG. 6.

In step S3000, the position orientation output determination unit 1060 checks whether or not the estimation of the first position orientation fails. A case where the estimation of the position orientation of the camera fails is a case where a solution is not obtained since the sufficient number of features used to find a solution of the equation for obtaining the position orientation of the camera are not obtained. In addition, the case where the estimation fails includes a case where the solution is not convergent in the iterative calculation in the nonlinear optimal calculation and dispersed because of an erroneous association of the features detected from the map and the image. Moreover, the case is not limited to these cases, and it may also be regarded that the estimation fails in a case where the difference from the previous frame is higher than a threshold $T_{diff}$. In a case where the estimation of the first position orientation fails, the processing proceeds to step S3010. In a case where the estimation of the first position orientation does not fail, the processing proceeds to step S3040.

In step S3010, the position orientation output determination unit 1060 checks whether or not the estimation of the second position orientation fails. The determination on whether or not the estimation fails is performed in processing similar to step S3000. In a case where the second position orientation estimation fails, the processing proceeds to step S3020. In a case where the second position orientation estimation does not fail, the processing proceeds to step S3030.

In step S3020, the position orientation output determination unit 1060 performs the determination on whether or not the camera position orientation estimated in the image in the previous frame (the image obtained before in the time series) is output.

In step S3030, the position orientation output determination unit 1060 determines that the second camera position orientation is output.

In step S3040, similarly as in step S3010, the position orientation output determination unit 1060 checks whether or not the second position orientation estimation fails. The determination on whether or not the estimation fails is performed in processing similar to step S3000. In a case where the second position orientation estimation fails, the processing proceeds to step S3050. In a case where the estimation of the first position orientation does not fail, the processing proceeds to step S3060.

In step S3050, the position orientation output determination unit 1060 determines that the first position orientation is output.

In step S3060, a first camera position and a second camera position (or orientations) are compared with each other. In a case where the difference is higher than the threshold $T_{pos}$ of the position (or the threshold $T_{Ori}$ of the orientation), the processing proceeds to step S3070. In a case where the difference is lower than or equal to the threshold $T_{pos}$ of the position (or the threshold $T_{Ori}$ of the orientation), the processing proceeds to step S3080.

In step S3070, it is determined that the second position orientation is output. This is because, in a case where the difference is higher than the threshold $T_{pos}$ of the position (or the threshold $T_{Ori}$ of the orientation that is not illustrated in the drawing), it is determined that the second position orientation estimated on the basis of the second feature having the high distinctive character has a higher stability.

In step S3080, it is determined that the first position orientation is output. This is because, in a case where the difference is lower than the threshold $T_{pos}$ of the position (or the threshold $T_{Ori}$ of the orientation that is not illustrated in the drawing), it is determined that the accuracy of the result estimated by using the large amount of information since the number of the first features is higher than the number of the second features.

As described above, the position orientation output determination unit 1060 performs the determination by using the presupposition that the first feature has the larger amount of information and higher accuracy as compared with the second feature but has the low stability because of the low distinctive character.

Descriptions will be given of the flow chart of FIG. 2 again.

In step S2090, when it is determined that either the first position orientation or the second position orientation is output, the determined position orientation of the camera is output to the CG data drawing unit 1080 that performs the CG drawing on the basis of the determination result.

In step S2100, to draw the CG data 400, the CG data drawing unit 1080 sets the position orientation output by the position orientation output unit 1070 as the virtual position orientation of the camera. The CG data drawing unit 1080 previously obtains the CG data. The CG data drawing unit 1080 draws the CG data by using the set virtual position orientation of the camera.

In step S2110, the image combining unit 1090 generates a combined image obtained by combining the image obtained in step S2010 and the CG data drawn in step S2100 with each other. A technology for combining an actual image with the CG data is a related-art technology, and detailed descriptions thereof will be omitted. Subsequently, the combined image is output to the display 500.

As described above, it is possible to determine whether or not the first camera position orientation or the second camera position orientation estimated on the basis of the first feature or the second feature that is a different feature from the first feature is output.

According to the present exemplary embodiment, in a case where the first feature is the corner point, the luminance gradient, the optical flow, or the like, if a small number of second features having the high distinctive character can be detected even in an environment where it is difficult to detect the first feature, the second camera position orientation estimated on the basis of the second feature having the high distinctive character can be output. In addition, in an environment where a large number of the first features such as the corner point, the luminance gradient, and the optical flow can be detected, it is possible to output the first camera position orientation estimated on the basis of the first features such as the corner point, the luminance gradient, and the optical flow. Furthermore, according to the technique for estimating the camera position orientation on the basis of the first features, when the difference between the first feature and the second feature is large because of the erroneous association by detecting the features of the similar shapes in such a case where the repeated pattern is detected, the result estimated from the second features having the high distinctive character can be output. In this manner, while the plurality of camera position orientations are estimated on the basis of the different features with regard to the first feature and the second feature, it is possible to output the stably and highly accurately estimated result in accordance with the environment.

Thus, while the mode for outputting one of the camera position orientations estimated on the basis of the different features is provided, it is possible to estimate the position orientation of the camera stably and highly accurately in still more environments.

Modified Example 1

According to the first exemplary embodiment, the approximate value of the position and the orientation of the camera is obtained on the basis of the feature where the position is already recognized in the estimation of the first position orientation or the second position orientation. However, the estimation of the approximate value is not limited to this. A general value setting unit that is not illustrated in the drawing may set the position orientation of the camera determined to be output by the position orientation output determination unit 1060 as a general value of the position orientation of the camera (initial value in the iterative calculation) that is not determined to be output for the subsequent position orientation derivation processing. In the first camera position orientation estimation or the second position orientation estimation in the next frame (subsequent frame), the estimation of the position orientation of the camera may be performed on the basis of the general value set by the general value setting unit that is not illustrated in the drawing.

As a result, it is possible to estimate the stable and also highly accurate camera position orientation.

Second Embodiment

According to the first exemplary embodiment, one of the first camera position orientation estimated on the basis of the first features or the second position orientation estimated on the basis of the second features is output. However, in a case where both the first position orientation and the second position orientation can be estimated, the position orientation output determination unit 1060 may determine to output both the camera position orientations. The determination on whether or not both the camera position orientations are output may be set by the user using a user interface (UI) that is not illustrated in the drawing, or setting information may be previously incorporated in a system. In a case where the position orientation output determination unit 1060 determines that both the first and second camera position orientations are output, the first camera position orientation and the second camera position orientation are output to the position orientation output unit 1070 for the camera.

Subsequently, when both the position orientations including the first position orientation and the second position orientation are input, the position orientation output unit 1070 calculates a combined third camera position orientation on the basis of the first position orientation and the second position orientation. The third position orientation may be obtained as an average position orientation of the first position orientation and the second position orientation. In addition, the average position orientation may be obtained by being weighted at a predetermined ratio on the basis of the degrees of stability estimated in the past. In a case where the third camera position orientation is calculated, the position orientation output unit 1070 may output the third position orientation.

As described above, the mode for outputting the average position orientation of the position orientations estimated on the basis of the different features is provided, it is possible to estimate the position orientation of the camera stably and highly accurately in still more environments.

Third Embodiment

According to the first and second exemplary embodiments, the determination is made to output one of the position orientations depending on whether or not the first or second position orientation estimation fails or whether or not the difference of the first or second camera position is higher than or equal to the threshold. Alternatively, in a case where the setting has been previously made to output both the position orientations, both the first and second position orientations are output, and the CG is drawn by using the combined third position orientation. However, the determination to output the first position orientation, the second position orientation, or both the first and second position orientations is not limited to this configuration. The position orientation to be output may be determined on the basis of the degree of stability of the first position orientation or the second position orientation.

The position orientation output determination unit 1060 estimates a first degree of stability at a time when the first position orientation is estimated. In a case where the three-dimensional information associated with the first feature is lower than a threshold $T_{zero}$, the first degree of stability is set as 0. The threshold $T_{zero}$ is set as a number at which the solution is not theoretically obtained. For example, in a case where the camera position orientation is estimated by a direct solution using DLT, $T_{zero}$ is set as 6 as the threshold at which the solution is not theoretically obtained. Similarly, estimation of a second degree of stability at a time when the second position orientation is estimated is performed.

The position orientation output determination unit 1060 may determine to output the position orientation having the higher degree of stability among the first degree of stability and the second degree of stability.

As a result, while the degree of stability is used among the camera position orientations estimated on the basis of the different features, it is possible to output the more stable camera position orientation.

As described above, the mode for outputting one of the first and second position orientations is provided, it is possible to estimate the position orientation of the camera stably and highly accurately in still more environments.

Fourth Embodiment

According to the first to third exemplary embodiments, the estimation of the position orientation of the camera at a certain time t in the image obtained in the time series has been described. However, the configuration is not limited to this as long as the calculation is performed on the basis of the estimation of the position orientation of the camera.

A motion estimation unit that is not illustrated in the drawing estimates a speed of a movement of the camera on the basis of the first position orientation estimated at a past time $t_p$ and the first position orientation at the time t. Alternatively, the speed of the movement of the camera is estimated on the basis of the second position orientation estimated at the past time $t_p$ and the second position orientation at the time t.

The position orientation output determination unit 1060 may determine the position orientation to be output on the basis of the speed of the movement of the camera estimated by the camera motion estimation unit that is not illustrated in the drawing. Since a speed of a movement of the position orientation of the camera, that is, a change amount per unit time is not a continuous movement, a threshold for determining as an erroneous estimation is set as a threshold $T_v$. One of the speeds of the movements estimated on the basis of the first position orientation or the second position orientation is larger than the threshold $T_v$, the estimation may be an erroneous estimation since the movement is not a continuous movement. For this reason, the position orientation output determination unit 1060 determines to output the camera position orientation having the movement smaller than the threshold $T_v$. The threshold $T_v$ may also be experimentally decided from the movement of the human head for the camera mounted to the HMD. For example, the threshold $T_v$ may be set as a parallel movement at 150 cm/sec or an angular rate at 120 degrees/sec. The threshold $T_v$ may be changed to a value specified by the user using the UI that is not illustrated in the drawing in accordance with a use case.

Similarly as described above, in a case where the continuous camera position orientation is not estimated because of the erroneous estimation, the camera position orientation estimated as a continuous change may be determined to be output.

With the above-described configuration, in an environment where the first features or the second features are not sufficiently obtained or an environment where the erroneous association is likely to occur, even in a case where the erroneous estimation of the camera position orientation is performed, if either the first or second camera position orientation is stably estimated, it is possible to output the stable camera position orientation.

Modified Example 2

The configurations of the above-described respective first to fourth exemplary embodiments do not necessarily need to be respectively independently implemented, and the configurations of the respective exemplary embodiments may be combined with each other.

Modified Example 3

According to the above-described respective first to fourth exemplary embodiments, the information processing apparatus 1000 connected to the head mount display has been described. However, the present invention is not limited to this mode. That is, the head mount display itself may be provided with the respective functions of the information processing apparatus 1000.

Modified Example 4

According to the above-described respective first to fourth exemplary embodiments, the video see-through type head mounted display has been described. However, the present invention is not limited to this configuration, and an optical see-through type head mount display may also be used.

Modified Example 5

According to the above-described respective first to fourth exemplary embodiments, the head mount display mounted to the head part of the user has been described. However, the present invention is not limited to this configuration, and a hand held display grabbed by the user to observe the CG may also be used.

Modified Example 6

The present specification also includes the following exemplary embodiment. For example, first, the second feature detection unit 1040 detects the square indices from the picked-up image and calculates the degree of reliability on the basis of the number of detected square indices, a distribution, and a size of the square indices occupied in the image. The degree of reliability is calculated to be higher as the number of square indices is higher. In addition, the degree of reliability is calculated to be higher as the distribution is wider. Moreover, the degree of reliability is calculated to be higher as the size of the square indices occupied in the image is larger. When the calculated degree of reliability is higher than a threshold, the second position orientation estimation unit 1050 calculates the position and the orientation of the image pickup apparatus on the basis of the square indices.

On the other hand, in a case where the degree of reliability is lower than or equal to the threshold, the first feature detection unit 1020 detects the natural features. Subsequently, the first position orientation estimation unit 1030 calculates the position and the orientation of the image pickup apparatus on the basis of the detected natural features.

According to the present modified example, it is not necessary to regularly perform the two position orientation calculations, and the processing can be alleviated.

Modified Example 7

The present specification also includes the following exemplary embodiment. For example, first, the first feature detection unit 1020 detects the natural features from the picked-up image and calculates the degree of reliability on the basis of the number of detected natural features and the distribution. The degree of reliability is calculated to be higher as the number of detected natural features is higher. In addition, the degree of reliability is calculated to be higher as the distribution is wider. When the calculated degree of reliability is higher than the threshold, the first position orientation estimation unit 1030 calculates the position and the orientation of the image pickup apparatus on the basis of the natural feature.

On the other hand, in a case where the degree of reliability is lower than or equal to the threshold, the second feature detection unit 1040 detects the natural feature. Subsequently, the second position orientation estimation unit 1050 calculates the position and the orientation of the image pickup apparatus on the basis of the detected natural feature.

According to the present modified example, it is not necessary to regularly perform the two position orientation calculations, and the processing can be alleviated.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
at least one memory; and
at least one processor in communication with the at least one memory, the at least one processor configured to operate as:
an image obtaining unit configured to obtain an image picked up by an image pickup apparatus;
a first detection unit configured to detect a first feature from the image;
a second detection unit configured to detect a second feature that is different from the first feature from the image by using a method different from a method of the first detection unit;
a first position orientation derivation unit configured to derive a position and/or orientation of the image pickup apparatus as a first position and/or orientation on the basis of the first feature detected from the image;
a second position orientation derivation unit configured to derive a position and/or orientation of the image pickup apparatus as a second position and/or orientation on the basis of the second feature detected from the image; and
a decision unit configured to decide one of the first position and/or orientation and the second position and/or orientation as the position and/or orientation of the image pickup apparatus by comparing a value based on at least one of the first position and/or orientation and the second position and/or orientation with a threshold.

2. The information processing apparatus according to claim 1, wherein the at least one processor further configured to operate as a determination unit configured to determine whether or not the derivation of the first position and/or orientation and the derivation of the second position and/or orientation respectively satisfy a predetermined condition.

3. The information processing apparatus according to claim 2, wherein, when it is determined that both the derivation of the first position and/or orientation and the derivation of the second position and/or orientation do not satisfy the predetermined condition, the first position and/or orientation is decided as the position and/or orientation of the image pickup apparatus.

4. The information processing apparatus according to claim 2, wherein, when it is determined that the derivation of the first position and/or orientation satisfies the predetermined condition and it is determined that the derivation of the second position and/or orientation does not satisfy the predetermined condition, the second position and/or orientation is decided as the position and/or orientation of the image pickup apparatus, and
when it is determined that the derivation of the second position and/or orientation satisfies the predetermined condition and it is determined that the derivation of the first and/or position orientation does not satisfy the predetermined condition, the first position and/or orientation is decided as the position and/or orientation of the image pickup apparatus.

5. The information processing apparatus according to claim 2, wherein, when it is determined that both the derivation of the first position and/or orientation and the derivation of the second position and/or orientation satisfy the predetermined condition, the position and/or orientation decided on the basis of an image obtained before the image is obtained is decided as the position and/or orientation of the image pickup apparatus.

6. The information processing apparatus according to claim 2, wherein the determination unit performs the determination while a failure of the derivation of the position and/or orientation is set as the predetermined condition.

7. The information processing apparatus according to claim 1, wherein the at least one processor is further configured to operate as a setting unit configured to set, in a case where the decision unit decides the first position and/or orientation as the position and/or orientation of the image pickup apparatus, the first position and/or orientation decided by the decision unit as an initial value of the processing by the second position and/or orientation derivation unit, and
configured to set, in a case where the decision unit decides the second position and/or orientation as the position and/or orientation of the image pickup apparatus, the second position and/or orientation decided by the decision unit as an initial value of the processing by the first position orientation derivation unit,
wherein the first position orientation derivation unit or the second position orientation derivation unit performs the processing on the basis of the set initial value.

8. The information processing apparatus according to claim 1, wherein the decision unit decides a position and/or orientation obtained by weighting the first position and/or orientation and the second position and/or orientation at a predetermined ratio as the position and/or orientation of the image pickup apparatus.

9. The information processing apparatus according to claim 1, wherein the at least one processor is further configured to operate as an obtaining unit configured to obtain degrees of stability of the derivation of the first position and/or orientation and the derivation of the second position and/or orientation, wherein the decision unit decides the position and/or orientation on the basis of the first position and/or orientation, the second position and/or orientation, and the degrees of stability.

10. The information processing apparatus according to claim 1, wherein the at least one processor is further configured to operate as an estimation unit configured to estimate a change of a movement of the image pickup apparatus from the position and/or orientation output at a predetermined time and the position and/or orientation output in a frame at a past time before the predetermined time,
wherein the decision unit decides the position and/or orientation of the image pickup apparatus on the basis of the first position and/or orientation, the second position and/or orientation, and the change of the movement.

11. The information processing apparatus according to claim 1,
wherein the first detection unit detects a pixel having a luminance gradient higher than or equal to a predetermined value in the image as the first feature by applying a predetermined filter to the image, and
wherein the second detection unit detects an area having a predetermined shape from the image and then reads internal identification information of the area to detect the second feature.

12. The information processing apparatus according to claim 1, wherein the first feature is a feature point having the luminance gradient in the image.

13. The information processing apparatus according to claim 1, wherein the second feature is a marker having a rectangular shape and having identification information inside the rectangle.

14. The information processing apparatus according to claim 1, wherein the at least one processor is further configured to operate as a generation unit configured to generate a computer graphics (CG) image on the basis of the output position and/or orientation.

15. The information processing apparatus according to claim 14, wherein the at least one processor is further configured to operate as:
the generation unit configured to generate a combined image obtained by combining the image with the CG image; and
a display control unit configured to display the combined image on a display device.

16. The information processing apparatus according to claim 15, wherein the display device is a head mount display mounted to a head part of a user.

17. A non-transitory computer-readable storage medium storing a program for causing a computer to function as the respective units of the information processing apparatus according to claim 1.

18. An information processing apparatus comprising:
at least one memory; and
at least one processor in communication with the at least one memory, the at least one processor configured to operate as:
an image obtaining unit configured to obtain an image picked up by an image pickup apparatus;
a second detection unit configured to detect a second feature from the image; and
a decision unit configured to decide, in a case where a result of the second detection unit satisfies a first condition, a position and/or orientation of the image pickup apparatus which is derived on the basis of the second feature as the position and/or orientation of the image pickup apparatus, and
configured to decide, in a case where the result of the second detection unit does not satisfy the first condition, a position and/or orientation of the image pickup apparatus derived on the basis of a first feature detected by using a detection method different from a detection method for the second feature as the position and/or orientation of the image pickup apparatus.

19. The information processing apparatus according to claim 18, wherein the decision unit decides the position and/or orientation of the image pickup apparatus derived on the basis of the second feature as the position and/or orientation of the image pickup apparatus in a case where the number of the second features detected by the second detection unit is higher than a threshold, and
decides the position and/or orientation of the image pickup apparatus derived on the basis of the first feature detected by using the detection method different from the detection method for the second feature as the position and/or orientation of the image pickup apparatus in a case where the number of the second features detected by the second detection unit is lower than or equal to the threshold.

20. A non-transitory computer-readable storage medium storing a program for causing a computer to function as the respective units of the information processing apparatus according to claim 18.

21. An information processing method comprising:
obtaining an image picked up by an image pickup apparatus;
detecting a first feature from the image;
detecting a second feature different from the first feature from the image by using a method different from a detection method of detecting the first feature;

deriving a position and/or orientation of the image pickup apparatus as a first position and/or orientation on the basis of the first feature detected from the image;

deriving a position and/or orientation of the image pickup apparatus as a second position and/or orientation on the basis of the second feature detected from the image; and deciding one of the first position and/or orientation and the second position and/or orientation as the position and/or orientation of the image pickup apparatus by comparing a value based on at least one of the first position and/or orientation and the second position and/or orientation with a threshold.

22. An information processing method comprising:

obtaining an image picked up by an image pickup apparatus;

detecting a second feature from the image; and deciding a position and/or orientation of the image pickup apparatus which is derived on the basis of the second feature as a position and/or orientation of the image pickup apparatus in a case where a result of the detecting satisfies a first condition and deciding a position and/or orientation of the image pickup apparatus which is derived on the basis of a first feature detected by a detection method different from a detection method for the second feature as the position and/or orientation of the image pickup apparatus in a case where the result of the detecting does not satisfy the first condition.

* * * * *